(12) United States Patent　　　　　(10) Patent No.: US 12,639,350 B2
　Ahmed et al.　　　　　　　　　　　　(45) Date of Patent: May 26, 2026

(54) RETRIEVAL OF UNSTRUCTURED DATA IN DPP INFORMATION ACCESS

(71) Applicant: SAP SE, Walldorf (DE)

(72) Inventors: Naved Ahmed, Bangalore (IN); Saritha Palli, Bangalore (IN); Shweta Gupta, Bangalore (IN)

(73) Assignee: SAP SE, Walldorf (DE)

( * ) Notice: Subject to any disclaimer, the term of this patent is extended or adjusted under 35 U.S.C. 154(b) by 541 days.

(21) Appl. No.: 17/404,451

(22) Filed: Aug. 17, 2021

(65) Prior Publication Data

US 2023/0054316 A1　　Feb. 23, 2023

(51) Int. Cl.
　*G06F 16/33*　　　(2025.01)
　*G06F 16/334*　　(2025.01)
　*G06F 21/62*　　　(2013.01)
(52) U.S. Cl.
　CPC ........ *G06F 16/334* (2019.01); *G06F 21/6218* (2013.01)
(58) Field of Classification Search
　CPC ............................ G06F 16/334; G06F 21/6218
　USPC ........................................................ 707/769
　See application file for complete search history.

(56) References Cited

U.S. PATENT DOCUMENTS

| 8,229,873 | B1 * | 7/2012 | Dolan | G06N 5/048 |
| | | | | 706/45 |
| 9,015,301 | B2 * | 4/2015 | Redlich | G06F 21/6254 |
| | | | | 707/777 |
| 2009/0254572 | A1 * | 10/2009 | Redlich | G06Q 10/10 |
| | | | | 707/707 |
| 2011/0145286 | A1 * | 6/2011 | LaRowe | G06F 16/951 |
| | | | | 715/705 |
| 2016/0314176 | A1 * | 10/2016 | Dhayapule | H04L 47/125 |
| 2020/0265150 | A1 * | 8/2020 | Bode | G06F 21/6209 |
| | | | | 707/707 |
| 2021/0350020 | A1 * | 11/2021 | Onishi | H04L 9/3226 |

* cited by examiner

*Primary Examiner* — Alexandria Y Bromell
(74) *Attorney, Agent, or Firm* — SCHWEGMAN LUNDBERG & WOESSNER, P.A.

(57)　　　　　　ABSTRACT

Systems, methods, and computer-readable media are disclosed for the centralized retrieval of personal data about a data subject across a plurality of applications. The data subject may request the retrieval of personal data from a company. To retrieve the personal data, a data model may be created for each application having personal data about the data subject. Each application may store personal data in the form of attachments. The data model may be in tabular form and store virtual representations of the attachments. Metadata for the attachments may be retrieved using the virtual representations of the attachments. The attachment metadata may then be used to retrieve the attachments. The attachments may then be provided to the data subject for download. The personal data may be provided to the data subject in both machine-readable and human-readable form to comply with data privacy regulations.

20 Claims, 5 Drawing Sheets

CREATE DATA MODEL ∿ 402

ADD FIELD LINKS TO THE DATA MODEL ∿ 404

LINK DATA MODEL TO RETRIEVAL MODULE ∿ 406

CALL RETRIEVAL MODULE AND RETRIEVE ATTACHMENT METADATA ∿ 408

RETRIEVE ATTACHMENTS USING METADATA AND APPEND TO INFORMATION REPORT ∿ 410

PROVIDE INFORMATION REPORT FOR DOWNLOAD ∿ 412

400

RETRIEVAL OF UNSTRUCTURED DATA IN DPP INFORMATION ACCESS

TECHNICAL FIELD

Embodiments generally relate to methods of data retrieval across multiple applications. More specifically, embodiments relate to a simplified, centralized retrieval of attachments comprising unstructured, personal data using an information retrieval framework to efficiently retrieve attachments across multiple applications.

RELATED ART

Data privacy and protection has become an important issue for consumers over recent years. Recently enacted laws, such as the European Union's General Data Protection Regulation, mandate that companies provide a way to retrieve stored personal data about a data subject and provide the data subject a copy of the personal data the company has on record. These laws also require the data to be formatted in a way that is both machine-readable and human-readable. Failure to comply with the laws can result in extensive fines and penalties for companies.

For companies who maintain a large amount of data spread out over tens, hundreds, or thousands of applications, retrieving data for a single data subject in an efficient manner may prove difficult. Personal data about a data subject is often stored as unstructured data, which is often more difficult to extract and present in a readable manner than structured data. One solution for retrieving data across multiple applications is to individually modify each application that stores data about data subjects, such that the applications are configured to retrieve the data when called. However, this can prove cumbersome and resource-intensive, especially as the number of applications increases, because each application would need to develop a specific framework for retrieving data and presenting data in the proper format.

Accordingly, a need exists for a centralized data retrieval system that enables personal data retrieval in a simplified and centralized manner across multiple applications. The centralized data retrieval system should be configured to retrieve unstructured data and present it in a format that is both human-readable and machine-readable.

SUMMARY

Disclosed embodiments address the above-mentioned problems by providing a simplified and centralized data retrieval framework. For each application from which data needs to be retrieved, a data model may be generated. The data model may comprise a table having representations of the attachments containing the data. With the attachment representations, metadata pertaining to the actual attachments may be retrieved, which can, in turn, be used to retrieve the actual attachments from a database. Once the attachments have been retrieved, the attachments may be added to an information report and delivered to the user.

A first embodiment is directed to a method for centralized retrieval of attachments comprising unstructured data across a plurality of applications, the method comprising receiving, from a data subject, a request for data retrieval to retrieve attachments form the plurality of applications, for each application of the plurality of applications, generating a data model, the data model comprising representations of attachments, adding to the data model, an attachment link for each of the attachments, retrieving attachment metadata for each of the attachments using the attachment link, retrieving, from at least one data store, the attachments using the attachment metadata, and providing, to the data subject, the attachments for download.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
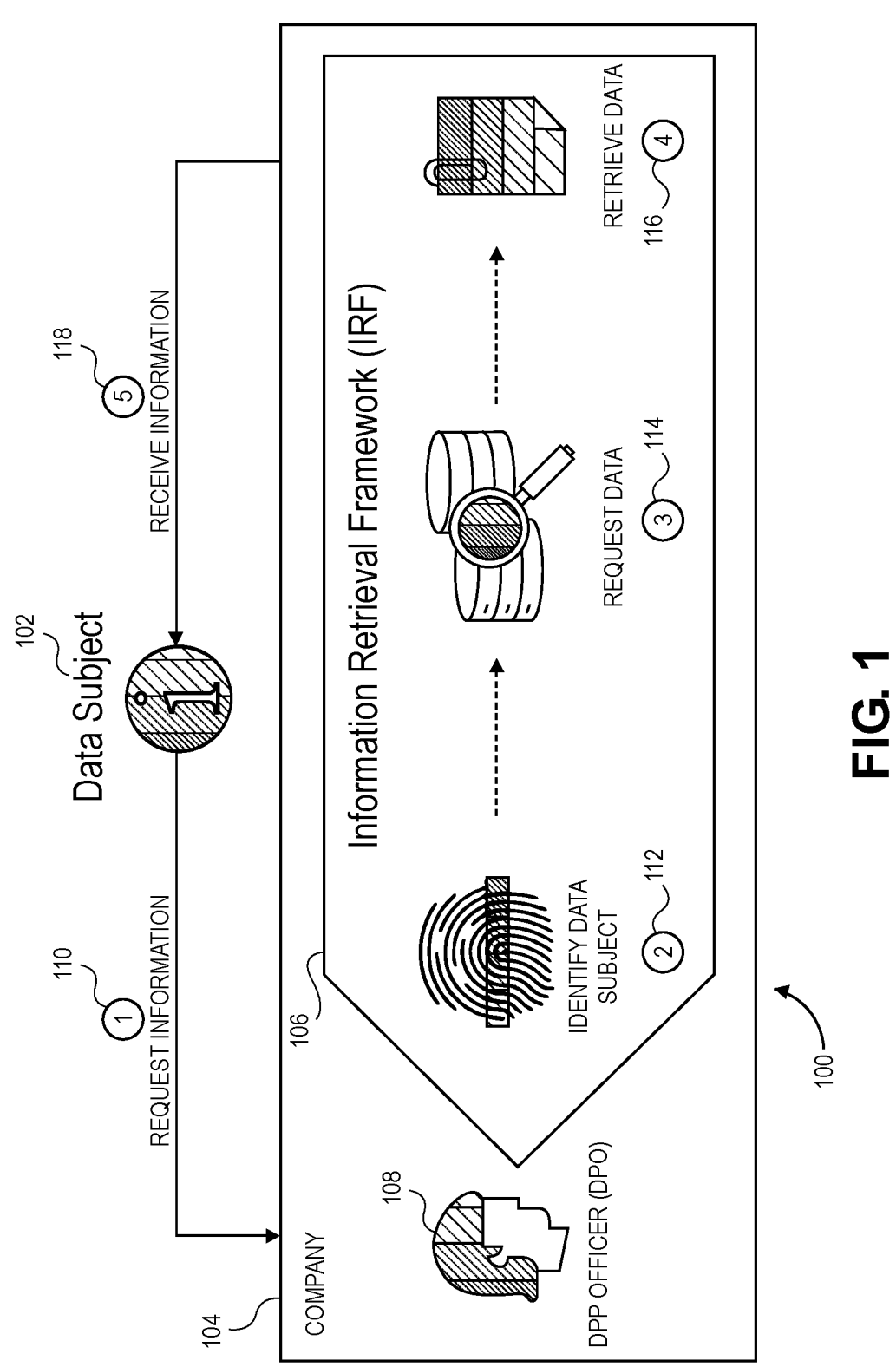
FIG. 1 illustrates an overview of data collection for certain embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

Systems and methods for the centralized retrieval of data are disclosed herein. Companies may store data about data subjects across tens, hundreds, thousands, or more of the company's applications. When a data subject requests personal data that the company has stored about them, the company must traverse across all applications that have stored data on the data subject, retrieve the stored data from each application, and provide it to the data subject. Personal data for data subjects is often stored in an unstructured format and may need to be organized and contextualized when retrieved such that the retrieved data may be displayed in an intelligible manner. The personal data may also need to be modified to be both machine-readable and human-readable when provided to the data subject to comply with various rules and regulations.

In some embodiments, the data for data subjects may be retrieved using an Information Retrieval Framework (IRF) that centrally fetches attachments from storage and presents the attachments in the machine-readable and human-readable format. Each application may be associated with an Information Lifecycle Management (ILM) object. The ILM object may comprise a wrapper in the form of a retention policy that defines when the data stored in the ILM object is to be archived or destroyed. The ILM object may comprise a list of a plurality of tables and links to each of the plurality of tables. The ILM object may also be mapped to one or more Business Object Retrieval (BOR) objects. Each BOR object may refer directly to application tables storing the data for the data subject. As such, the IRF may utilize both the ILM object and the BOR objects to retrieve the unstructured data for the data subject and present the unstructured data to the data subject upon request.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1 illustrates method 100 depicting a broad overview of data collection for a data subject 102 requesting personal data from company 104 in some embodiments. Data collection may be performed by company 104 utilizing Information Retrieval Framework (IRF) 106. As described above, company 104 may own or be responsible for a large number of applications that store personal data about data subject 102. When a data subject 102 requests personal data retrieval, company 104 may, therefore, responsible for retrieving the personal data from each of the applications storing personal data on data subject 102. In some embodiments, once data retrieval is complete, company 104 provides data subject 102 with an information report comprising an appended list of attachments that contains the personal data. The attachments may comprise both unstructured data mixed with structured data. An example of structured data may be the name of data subject 102 which may be represented in a consistent manner throughout the applications of company 104, such as First Name, Last Name or Last Name, First Name.

As an example, consider that company 104 is an online retailer. Data subject 102 may make various purchases from company 104 and all purchase-related data including the products, the item, price, and the like may be stored in various tables stored by the ILM object, as will be discussed further below. Data subject 102 may make an order from company 104, with the order comprising three purchased items. The order and the purchased items may represent unstructured data that needs to be correctly formatted and presented to data subject 102. Each purchased item may have an item name, an item description, an item price, and other similar data. Various online retailers may represent this data in various formats; as such, the data may be considered to be unstructured. Therefore, when data subject 102 requests data, company 104 may need to structure the data to present it in a human-readable format. As such, the order made by data subject 102 should be presented such that each line item and details associated with the line item are correct. For example, if the three purchased items are a basketball, a pair of sunglasses, and a t-shirt, the item description, item picture, item price, and the like for the basketball should not be mixed with item details for the sunglasses or the t-shirt.

IRF 106 may provide a centralized solution for data collection and report creation in response to data retrieval requests from data subject 102. In some embodiments, IRF 106 comprises all relevant database tables that are searched for personal data for a data subject 102. IRF 106 may also define table relationships and determine how data tables are linked to one another. In some embodiments, tables may be linked using field-to-field links between tables. IRF 106 will be discussed in more detail below with respect to FIGS. 2 and 3. To handle data requests from data subjects 102, Company 104 may employ a Data Protection and Privacy (DPP) Officer 108. In some embodiments, data retrieval is fully automated and no DPP officer 108 is present to handle data requests. In some embodiments, data retrieval may be fully automated using various workflows and/or APIs to handle incoming requests and provide the retrieved data to data subjects 102 once the data has been retrieved across the applications. For example, DPP officer 108 may create a workflow comprising a series of steps to handle incoming data retrieval requests from data subjects 102, creation and/or modification of the data models, providing the retrieved data to data subjects 102, or any combination thereof.

Method 100 may begin at step 110 where data subject 102 may request information from company 104. Data subject 102 may make the request using various communication methods or channels. For example, data subject 102 may request data via email, phone, a secure messaging channel, an online form, or the like. Data subject 102 may provide personal information (e.g., name, phone number, address, etc.) when making the data request to allow company 104 to identify data subject 102. The data request may then be passed to DPP officer 108 for initiation of data retrieval using IRF 106.

At step 112, data subject 102 may be identified within the system of company 104. Company 104 may have information stored on data subject 102 across various applications, in a central database, or a combination of the two. DPP officer 108 may identify data subject 102 based on information related to data subject 102, such as name, address, data subject type (e.g., user, customer, vendor, business partner, etc.), or any other identifying information. The data subject type may be associated with an identifier, such as a username, a customer number, a business partner number, a supplier number, a vendor number, or the like.

Once data subject 102 has been identified, DPP officer 108 may request data retrieval for data subject 102 at step 114. The data request may be done via a user interface associated with IRF 106. In some embodiments, DPP officer 108 sets one or more retrieval parameters for the data request. The retrieval parameters may comprise a type of data subject 102, an identification for data subject 102, a language associated with data subject 102, a purpose for data retrieval, a user profile associated with the data retrieval, or a combination thereof. The type of data subject 102 may indicate the relationship of data subject 102 to company 104. For example, data subject 102 may be a customer, a vendor, a user, or a business partner of company 104. In some embodiments, data subject 102 may comprise more than one data subject type. For example, a business partner may be both a customer and a vendor of company 104. The type of data subject 102 may also affect which personal data is stored about data subject 102. For example, the personal data stored for a data subject 102 who is a customer of company 104 may be different than the personal data stored for a data subject 102 who is a vendor for company 104. The language parameter may be set to comply with the human-readable requirement of the various data privacy laws such that data subject 102 is able to read the data provided.

The purpose for the data retrieval may define which data is to be collected, authorization rights, a set of filters for the data, or a combination thereof. Authorization rights may be set to restrict users from accessing data from specified applications. In some embodiments, authorization rights define a user's access level to view the data retrieval results. In some embodiments, filters may be set to restrict data retrieval to a specific legal entity, a data controller, a product, a country, a region within a country (e.g., a city) or a region comprising multiple countries (e.g., the European Union), a company code, or any combination thereof. Broadly, filters may be set on any field of any table from which data is retrieved. The purpose parameter may be used to identify which applications across company 104 need to be accessed for data retrieval. The user profile may allow data subject 102 and/or DPP officer 108 to configure various settings related to the collection, display, and download of the data collection. For example, data subject 102 may turn on automatic downloading of the data or may select a subset of the data to be automatically downloaded. In some embodiments, returned personal data that contains empty fields can be hidden. As another configuration option, data subject 102 may define tables or fields that are hidden when the personal data is displayed. In some embodiments, hidden tables or fields may be performed on a purpose-specific basis. For example, data subject 102 may elect to hide a table related to billing when the defined purpose is to search all applications related to sales. As another example, data subject 102 may configure the file in which data is presented, such as a PDF or a CSV file. As yet another example, data collection may be configured by restricting the data search to a hierarchy depth (e.g., three nodes beneath the root node) or to exclude tables from being searched. In some embodiments, data subject 102 can be identified without all of the retrieval parameters.

Next, at step 116, the data retrieval process is initiated. IRF 106 may traverse across all applications within company 104 and retrieve all relevant data for data subject 102. In some embodiments, IRF 106 retrieves both structure and unstructured data. The structured data may be used to contextualize the unstructured data. In some embodiments, the data is unstructured data in the form of attachments, which may be arranged to be presented in a human-readable manner. The attachments may then be retrieved and appended to an information report that is provided to data subject 102. The data retrieval step will be discussed in further detail below with respect to FIGS. 2-4. DPP officer 108 may monitor data retrieval for all data subjects 102 as the retrieval is in process. In some embodiments, data retrieval may be assigned one of an in-process state, a finished state, or an error state. In some embodiments, DPP officer 108 may restart or cancel in-progress data retrievals.

Once the data is retrieved, processing may proceed to step 118, where the data is provided to data subject 102. As described above, the data may be provided with an information report that is both machine-readable and human-readable. DPP officer 108 may download the information report and transmit it to data subject 102, where it may be viewed by data subject 102. In some embodiments, the identify of data subject 102 is verified before data subject 102 is allowed to view the data, such as with a username and password. In some embodiments, once data retrieval is complete, the information report and the appended attachments are automatically transmitted to data subject 102 for download and viewing. The information report may comprise various contextual information to contextualize the unstructured data. In some embodiments, the data is validated before data subject 102 is allowed to download the data. DPP officer 108 may be able to view the data during retrieval and/or after retrieval and validate that the retrieved data is associated with the identified data subject 102.

Data subject 102 and/or DPP officer 108 may configure download parameters for attachments such as a file type, which may comprise one of a text file, an XML file, a JSON file, a CSV file, or a PDF file, or a combination thereof. The data may then be provided to data subject 102 in a ZIP file or other compressed file type. In some embodiments, a separate file is created for each application. The volume of data retrieved for data subject 102 may also result in data being split into multiple files. In some embodiments, the downloadable file is read access logging enabled such that company 104 may log read access of sensitive personal data to track who accessed personal data of data subject 102 and which personal data was accessed. For example, read access logged data may store metadata such as a time when the data was accessed, which data files were accessed, and who accessed the data files. Thus, the privacy of the personal data of data subject 102 may be preserved, and, when the privacy of data subject 102 is violated, offenders may be tracked.

Once the data is downloaded, it may then be displayed to data subject 102 via a user interface. The display of personal data may also be read access log enabled, such that metadata related to who viewed the personal data and which personal data was viewed may be tracked. The display may be configured using the purpose and/or the user profile retrieval parameters. Data subjects 102 may create a user profile that defines various parameters for displaying retrieved data. For example, data subject 102 may define a set of tables and/or applications to be excluded from the data retrieval. As another example, data subject 102 may choose to hide various portions of the data once retrieved, such as tables, table fields, empty table fields, all fields of a table, or any combination thereof. As such, data subject 102 may configure the retrieved data to be presented in their preferred manner. In some embodiments, the user profile may define fields that are masked along with specifying masking character and length. For example, data subject 102 may opt to mask specific data that is sensitive, such as any monetary data, to protect the privacy of the data. Another user profile parameter may comprise the exclusion, hiding, masking, or a combination thereof, of all tables and/or fields having data that match a given pattern. As will be discussed in further detail below, in some embodiments, data is retrieved in a hierarchical manner. As such, in some embodiments, the user profile may define certain portions of the hierarchy to not be searched when retrieving data. For example, data subject 102 may desire to not search the lowest level of the hierarchy.

In some embodiments, the user profile can be used to define various download parameters. Example download parameters include but are not limited to automatic download of attachments; hiding, masking, or excluding various fields within the tables as described above; and download formats such as JSON, text, XML, and PDF. Data subject 102 may also choose to have the retrieved personal data presented textually rather than in a tabular format which may be configured on a per table or per application basis. In some embodiments, the user profile may change the default description for the retrieved tables and fields, thus allowing a more customizable data retrieval for data subject 102. As still another example, data subject 102 may choose to set default values for various fields within the retrieved data tables. For example, data subject 102 may initialize certain fields to 0 or any other desired value. In some embodiments, the various user profile settings may be specific to a certain application or to a certain purpose that defines the various applications from which data may be retrieved. As such, data subject 102 may customize data retrieval for all applications across company 104. Data subject 102 may also derive settings from a generic level to a more specific level. For example, settings initialized for one purpose may be transferred easily to a second purpose without having to reinitialize all the settings. While the above-described user profile parameters have been described with respect to being configured by data subject 102, in some embodiments, DPP officer 108 may also configure any of the user profile settings.

Figure 2:
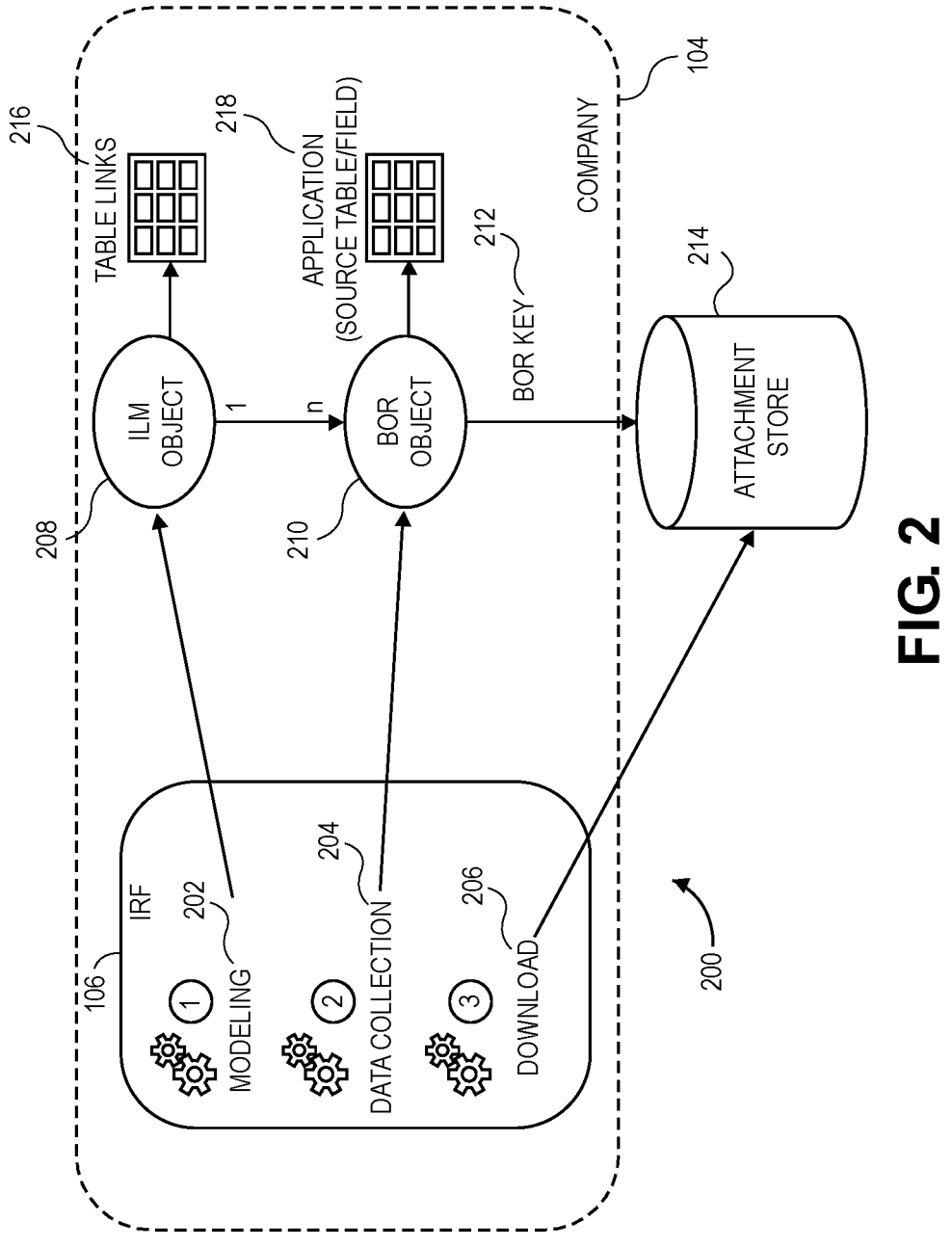
FIG. 2 illustrates a flow diagram for centralized data retrieval for certain embodiments.

FIG. 2 illustrates retrieval flow diagram 200 for data retrieval using IRF 106 for some embodiments. Retrieval flow diagram 200 represents an overview of step 116 and step 118 described above for some embodiments. As shown, data retrieval is completed in three steps using IRF 106. The process may begin at step 202 where a data model for the application may be generated. In some embodiments, for each application within company 104 having personal data related to data subject 102, a distinct data model will be generated. Next, at step 204, data collection may occur and attachment metadata for attachments storing personal data about data subject 102 may be retrieved. Lastly, at step 206, the attachments may be retrieved using the attachment metadata and downloaded for viewing by data subject 102.

Also illustrated in FIG. 2 is the relationship and interaction between IRF 106, ILM object 208, BOR object 210, BOR keys 212, and attachment store 214 for each of the steps outlined above. As briefly described above, ILM object 208 may be an object that is wrapped with an archiving or a destruction object. In some embodiments, the archiving object comprises a time period at which data is archived followed by a period after which data is deleted. For example, the archiving object may specify to archive data after five years and delete the data ten years after it has been archived. In some embodiments, a destruction object only defines the time period after which data is deleted and unable to be retrieved. In some embodiments, the archiving or destruction object comprises an ILM table links 216. For example, an ILM object 208 for product sales may include an ILM table links 216 that has a list of links to tables for sales, products, costs, inventory, and the like. The retention object (i.e., the archiving or the destruction object) may define when the personal data is to be destroyed or archived. In some embodiments, archived data is data that is deleted but may be restored, while destroyed data is data that is deleted and unable to be restored. The retention object may define a set period of time (e.g., five years) for which data is held after the data has been processed for its primary purpose. For example, if the personal data relates to a payment for an online order, the retention policy for the personal data may require the data is deleted after five years. In some embodiments, once the data has been processed, the personal data is only accessible by an authorized user, such as DPP officer 108.

As described above, each application may be associated with a specific ILM object 208. ILM object 208 may further define various BOR objects 210. BOR objects 210 may directly refer to the various application tables in which the unstructured (and structured), personal data may be stored. In some embodiments, BOR objects 210 may be customized or extended. For example, a BOR object 210 may be extended to include a new object type. In some such embodiments, IRF 206 may still retrieve data from the customized or extended BOR object 210 by following retrieval flow diagram 200. Each BOR object 210 may be mapped to a specific BOR table 218. BOR tables 218 may comprise a source table and source field links, wherein the source field links may store attachment metadata. In some embodiments, the mapping of BOR objects 210 to BOR tables 218 allows for the determination of BOR keys 212. In operation, ILM object 208 may provide one or more Application Program Interfaces (APIs) to retrieve or create BOR keys 212 based on source fields from BOR tables 218. In some embodiments, BOR keys 212 are object instance keys created for retrieving the attachment and attachment metadata. The retrieved BOR keys 212 may then be used to fetch attachments from attachment store 214. Attachment store 214 may be a database or content server storing attachments and other data for company 104. In some embodiments, attachment store 214 is hosted by company 104. In some embodiments, attachment store 214 is hosted by a third party outside of company 104.

At step 202, to retrieve data for data subject 102, IRF 106 may create a data model for the application that contains personal data for data subject 102. Step 202 may be completed for each application using the application's associated ILM object 208. In some embodiments, data models are created prior to receiving a request for data retrieval from data subject 102. Upon receiving the data retrieval request, the pre-created data models may then be adjusted to retrieve data for data subject 102. To retrieve attachments storing the unstructured, personal data, the attachment metadata may need to be retrieved. In some embodiments, the metadata for an attachment comprises a file name, a description, a created date, or a combination thereof. In some embodiments, the data model may be thought of as a dummy table that holds virtual representations of each of the attachments that need to be retrieved. In some embodiments, the dummy table acts as a place holder for to-be-retrieved attachments within the data model. The dummy table may comprise a set of dummy fields for each of the attachments.

To determine which attachments need to be retrieved, the purpose retrieval parameter may be analyzed. Each attachment stored in attachment store 214 may have an associated field link stored in ILM table links 216. As such, once the attachment representations are added to the data model, the field links for each of the attachments may be retrieved from ILM table links 216 using the dummy fields for the virtual representations. The field link may comprise details on the source fields thus allowing the dummy fields of the dummy table to connect to the actual attachments. For example, if the data model is being created for a table OrderItems, field one of the dummy table may represent the ItemID field of OrderItems, while field two of the dummy table may represent ItemCode of OrderItems, and field three may represent ItemPrice of OrderItems. Each of the fields may comprise the field link that may then be used to retrieve the actual data from the table OrderItems, as will be discussed in further detail below. Thus, the resultant data model may comprise the virtual representations of the attachments and the field links for the actual attachments. By representing the attachments using the dummy table, the unstructured data attachments may be retrieved across the plurality of applications in the correct context.

In some embodiments, ILM objects 208 may comprise hundreds or thousands of database tables which may prove cumbersome to search and manage when retrieving data. As such, to increase processing efficiency when searching an ILM object 208 to retrieve attachments, ILM table links 216 may be clustered or grouped together when creating the initial data model for an ILM object 208. ILM table links 216 may be clustered if they are logically related. For example, ILM table links 216 that share at least one of the same application component, a delivery software package, a delivery software unit, or a combination thereof may be clustered. In some embodiments, IRF 106 creates groups of table clusters sharing one of the same application component, the same delivery software package, the same delivery software unit, or a combination thereof to simplify the searching process. For example, all ILM table links 216 related to products may be clustered together while all ILM table links 216 related to billing may be separately clustered together.

In some embodiments, IRF 106 is configured with various add-ins. The add-ins may be used to modify the tables initially included in the data model by IRF 106. For example, the add-ins may remove superfluous tables and/or add any missing tables. In some embodiments, applications that utilize IRF 106 may view a list of table relationships generated when the data model is created. Thus, any table present in the data model that has no relationship to any other data table may be considered to be superfluous and be removed from the data model. Similarly, in some embodiments, a table that has relationships to other data tables in the data model but is not currently present in the data model may be considered a missing table and be added to the data model. The add-ins may also be used to modify the description of tables, fields, field values, or a combination thereof, thus allowing retrieved data to be more easily searched. In some embodiments, the add-ins allow for relationships and field-to-field links initialized by IRF 106 to be corrected if erroneous.

With the dummy table created, processing may proceed to step 204, where the attachment metadata for the attachments may be retrieved. As described above, the purpose retrieval parameter may define which applications data subject 102 wishes to be searched for personal data. As such, ILM objects 208 associated with. Once the relevant ILM objects 208 are determined, the BOR objects 210 associated with each of the ILM objects 208 may be determined as well. In some embodiments, each BOR object 210 owned by ILM object 208 is searched for personal data retrieval. As described above, various APIs may be called to determine the relevant BOR keys 212. Each BOR object 210 may be associated with one attachment stored in attachment store 214; as such, once all BOR object 210 have been identified, the relevant metadata for the attachments may be determined and BOR keys 212 may be created. The BOR keys 212 and the relevant metadata may be stored in an attachment metadata table.

Processing may then proceed to step 206 where the attachments and the information report may be downloaded. Various retrieval APIs may be called to retrieve attachments based on the attachment metadata stored in the table. Generally, any attachment framework API or metadata retrieval API operable to retrieve attachments from attachment store 214 using the attachment metadata may be used to retrieve the attachments. For example, the Generic Object Services (GOS), Business Document Services (BDS), Archive Link (ARL), Document Management Services (DMS) APIs, or a combination thereof may be used to retrieve data. Once the attachments have been retrieved via the various APIs, the attachments may be appended to the information report. The information report, with the appended attachments, may then be provided to data subject 102 (via DPP officer 108 in some embodiments) for download and viewing.

Figure 3:
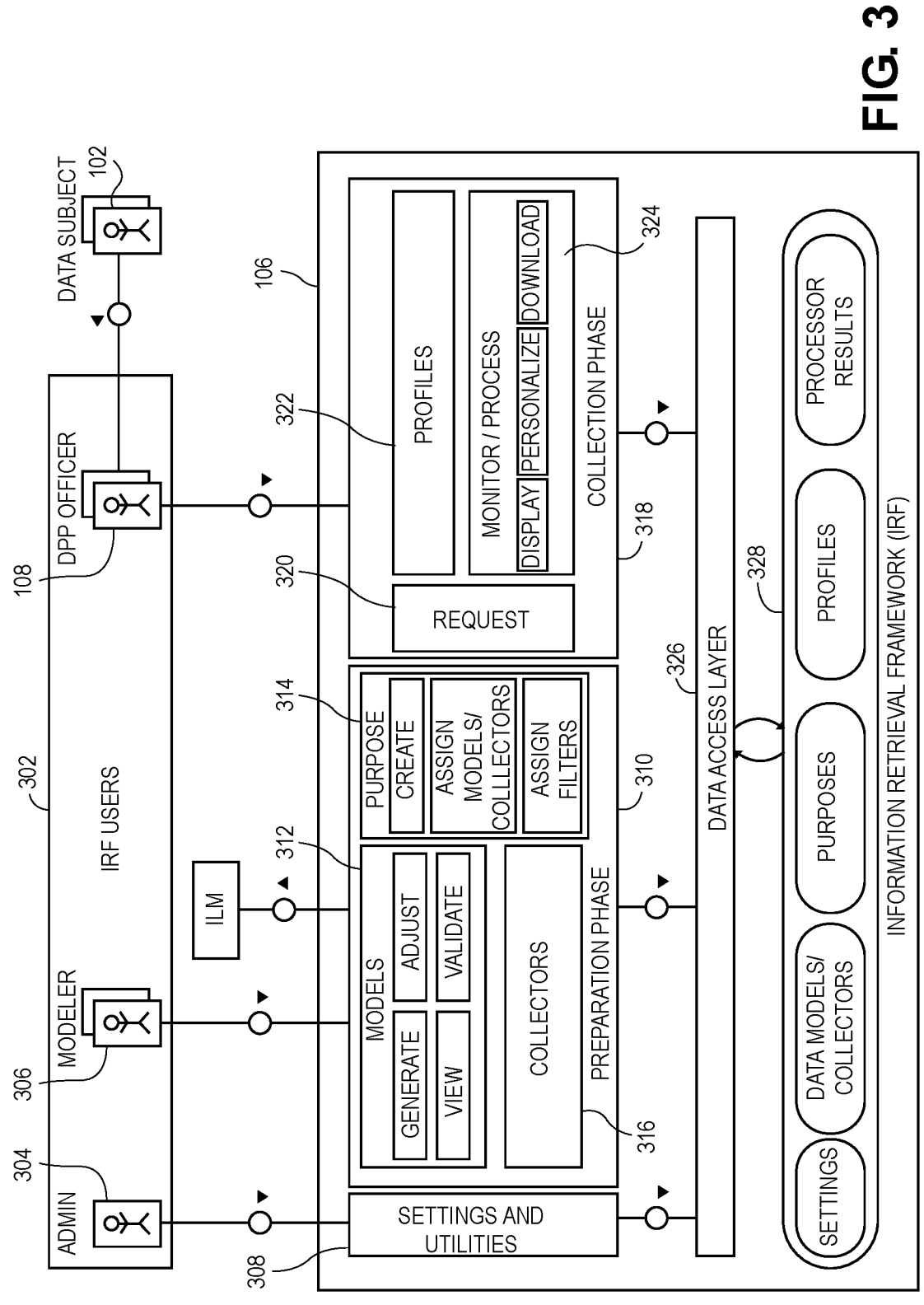
FIG. 3 illustrates an information retrieval framework architecture for certain embodiments.

FIG. 3 illustrates the architecture of IRF 106 for certain embodiments. As shown, IRF 106 may be used by various IRF users 302. In some embodiments, IRF users 302 comprise an admin 304, a modeler 306, and DPP officer 108. Admin 304 may manage settings and utilities block 308 for IRF 106. For example, admin 304 (along with data subject 102 and DPP officer 108) may configure the initial download settings (e.g., file type) for personal data retrieval. In some embodiments, settings and utilities block 308 may be used to activate the Open Data Protocol (OData) services. OData services may be used to enable data transfer between the data model and a back end system associated with company 104.

Modeler 306 may work with preparation phase 310 to create data models 312. Preparation phase 310 may also comprise purpose 314 and collectors 316. Data models 312 may store the data models generated at step 202, as described above. Purpose 314 may correspond to the purpose retrieval parameter described above. In some embodiments, purpose 314 is assigned to an ILM object 208. Thus, a purpose 314 may be defined by data subject 102 or DPP officer 108 to indicate which ILM object 208 (i.e., which application) should be traversed for personal data retrieval. In some embodiments, a single purpose 314 is assigned to a single ILM object 208. In some embodiments, a single purpose 314 can be assigned to multiple ILM objects 208. In some embodiments, collectors 316 represent specified sets of data to be retrieved and sent to IRF 106. For example, collectors 316 may defined if modeler 306 only wants specific tables of ILM object 208 to be searched for data. In some embodiments, collectors 316 may be specified for any data tables that are not a part of ILM object 208 but contain personal data about data subject 102.

Along with managing data requests for data subject 102, DPP officer 108 may further manage collection phase 318 of IRF 106. Collection phase 318 may comprise or store data requests 320, user profiles 322, and monitoring block 324. DPP officer 108 may monitor stored and incoming data requests 320. In some embodiments, DPP Officer can configure user profiles 322 which may be used to customize attachment download and display parameters. Monitoring block 324 may be a background process that monitors incoming data requests from data subjects 102. Monitoring block 324 may alert DPP officer 108 when a new data request is received. DPP officer 108 may monitor data retrieval for all data subjects 102 as the retrieval is in process. In some embodiments, data retrieval may be assigned one of an in-process state, a finished state, or an error state. In some embodiments, DPP officer 108 may restart or cancel in-progress data retrievals. It should be noted that the functions performed by admin 304, modeler 306, and DPP officer 108 are not limited to each being performed by a single actor. For example, DPP officer 108 may perform each of the roles of admin 304, modeler 306, and DPP officer 108 to provide data for data subject 102.

Each of settings and utilities block 308, preparation phase 310, and collection phase 318 may be connected to data access layer 326. Data access layer 326 may in turn be connected with data block 328 for retrieving various data for IRF 106. For example, and as illustrated in FIG. 3, data block 328 may comprise the settings, data models, purposes, profiles for data subjects 102, data retrieval results, or a combination thereof that is stored in IRF 106.

Figure 4:
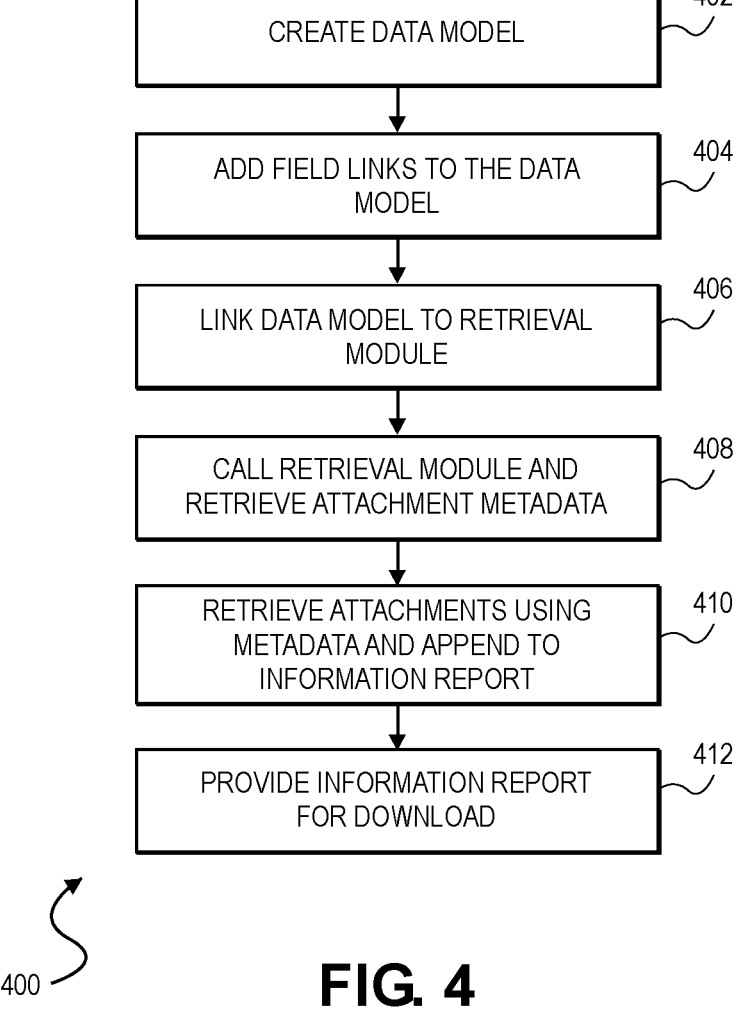
FIG. 4 illustrates an exemplary flow chart for the centralized retrieval of attachments comprising unstructured data across a plurality of applications.

FIG. 4 illustrates an exemplary method 400 for the centralized retrieval of attachments from an application. While method 400 will be described herein with reference to retrieving data from a single application, it should be noted that, when a data subject 102 requests data, method 400 may be performed across all applications owned by company 104 that have personal data on data subject 102. In some embodiments, method 400 is performed only on those applications which are known to have data about data subject 102. In some embodiments, data retrieval is performed only on applications associated with ILM objects 208 that are assigned to purpose 314.

Method 400 may begin at step 402, where data model 312 for the application may be created. Step 402 may be substantially similar to step 202 described above with respect to FIG. 2. In some embodiments, data model 312 may be generated automatically by IRF 106 based on purpose 314. When automatically generating data model 312, IRF 106 may group or cluster related tables together to increase retrieval efficiency. For example, tables that share the same application component may be clustered together. The data model 312 may then be further modified by modeler 306, if necessary. When further modifying data model 312, modeler 306 may modify the initial set of tables generated by IRF 106. Modifying the set of tables may be done using one or more business add-in objects that may remove or add tables to data model 312.

In some embodiments, data model 312 is in the form of a table that comprises representations of the attachments (i.e., the unstructured data) to be appended to the information report. Due to the unstructured nature of the personal data being retrieved, it may be necessary to initially create and store representations of the attachments in data model 312 to facilitate retrieve attachments from attachment store 214. Initially adding representations of attachments to data model 312 may allow for the hierarchy between the unstructured data to be maintained. Returning to the example of the order purchased from the online retailer, by representing the attachments in the data model, the hierarchy may be maintained that keeps data for each product order in the correct place. As such, the purchase details for the basketball, for example, may not be mixed with the purchase details for the t-shirt.

At step 404, field links may be added to data model 312. Each field link may be retrieved from BOR tables 218 and added to a field of data model 312. As described above, each BOR object 210 may have an associated BOR table 218 storing field links to the source tables for the attachments. In some embodiments, each attachment being retrieved will have an associated field link added to data model 312. Thus, the field link may aid IRF 106 in identifying the relevant attachment in attachment store 214.

At step 406, data model 312 may be linked with a retrieval module. In some embodiments, the retrieval module is stored within each application of company 104. The retrieval module may be a pre-defined function module that allows for the reuse of global functions across all applications in company 104. The retrieval module may comprise various parameters related to the attachments. In some embodiments, the parameters include purpose 314, the table link for data model 312, each of the field links from data model 312, a set of values corresponding to any structured data that needs to be collected, or a combination thereof. As described above, purpose 314 for data retrieval may be defined by either data subject 102 or DPP Officer 110. Using the information contained within purpose 314, the relevant ILM objects 208 and their corresponding applications may be identified. In some embodiments, the field links stored in the retrieval module may be those added to data model 312 at step 404. The retrieval module may also store various values that are associated with any structured data stored in the applications that may be retrieved as part of the personal data retrieval.

Processing may then proceed to step 408 where the retrieval module may be called and attachment metadata for the attachments may be retrieved. To retrieve attachment metadata, the list of ILM objects 208 defined by purpose 314 may be retrieved. Using the list of ILM objects 208, BOR keys 212 may be determined for the attachments. The BOR keys 212 may be determined by calling an API associated with ILM object 208. Each BOR key 212 may then in turn be used to retrieve attachment metadata for an attachment. Attachment metadata may comprise an attachment created data, an attachment file name, an attachment file size, an attachment file type, an attachment description, or a combination thereof. The attachment metadata may then be saved in the attachment metadata table as described above. BOR keys 212 may be saved in the attachment metadata table. In some embodiments, the attachment metadata is stored within the framework of IRF 106.

At step 410, after retrieving attachment metadata, the attachment metadata may then be used to retrieve the attachments from attachment store 214. The attachments may be retrieved using various attachment framework APIs as described above. For example, the GOS, BDS, or ARL APIs may be utilized. In some embodiments, once the attachments have been retrieved, the attachments may then be appended to the information report. In some embodiments, the retrieval is done using a search tree. For example, when a company 104 hierarchy starts with business partner at the top of the hierarchy, the search may begin by searching ILM table links 216 associated with the business partner. From the ILM table links 216 for the business partner, a link to a BOR object 210 comprising the data for data subject 102 may be extracted. The BOR object 210, in turn, may have a table storing links to further tables below in the hierarchy. For example, the BOR object 210 table may have a link to a sales table comprising all purchases made by data subject 102. Similarly, the sales table may have links to various other subtables, such as a products or billing subtable. Thus, data may be retrieved across various applications throughout company 104.

Next, at step 412, the information report may be provided for download. The information report may be provided to either or both of DPP officer 108 and data subject 102. In some embodiments, the information report is provided to DPP officer 108 who then transmits the information report to data subject 102. As described above, the information report should provide the data in a contextualized manner that makes the information report understandable. For example, consider that data subject 102 has a user profile picture associated with company 104 and stored by company 104 in attachment store 214. Also consider that data subject 102 made the online order from company 104 for the t-shirt, and that the t-shirt was to be made with a picture of data subject 102 thereon. As such, when the information report is compiled and sent to data subject 102, the profile picture may be presented in two contexts. The first context may be with the general profile information related to data subject 102 (e.g., name, address, and the profile picture). The second context may be for the t-shirt. The profile picture should be displayed such that it is clear to data subject 102 that the profile picture was used to create the t-shirt with the image thereon. As described above, this may be done in part by the virtual representation of the attachments storing the purchase order data done at step 402 that allows for the hierarchy between the various unstructured data and the structured data to be maintained.

In some embodiments, the information report is provided in a ZIP file. Data subject 102 may then download the information report to his or her computer, mobile device, laptop, tablet, or the like. Thus, data subject 102 may have access to the personal data that is presented in a the machine-readable and human-readable format. As described above, data subject 102 and/or DPP officer 108 may configure various settings for download and display of the personal data. For example, data subject 102 may elect to download personal data from one application defined by purpose 314 but not another application also defined by the same purpose. In some embodiments, data subject 102 can configure to only download files comprising personal data that are below a file size threshold.

Figure 5:
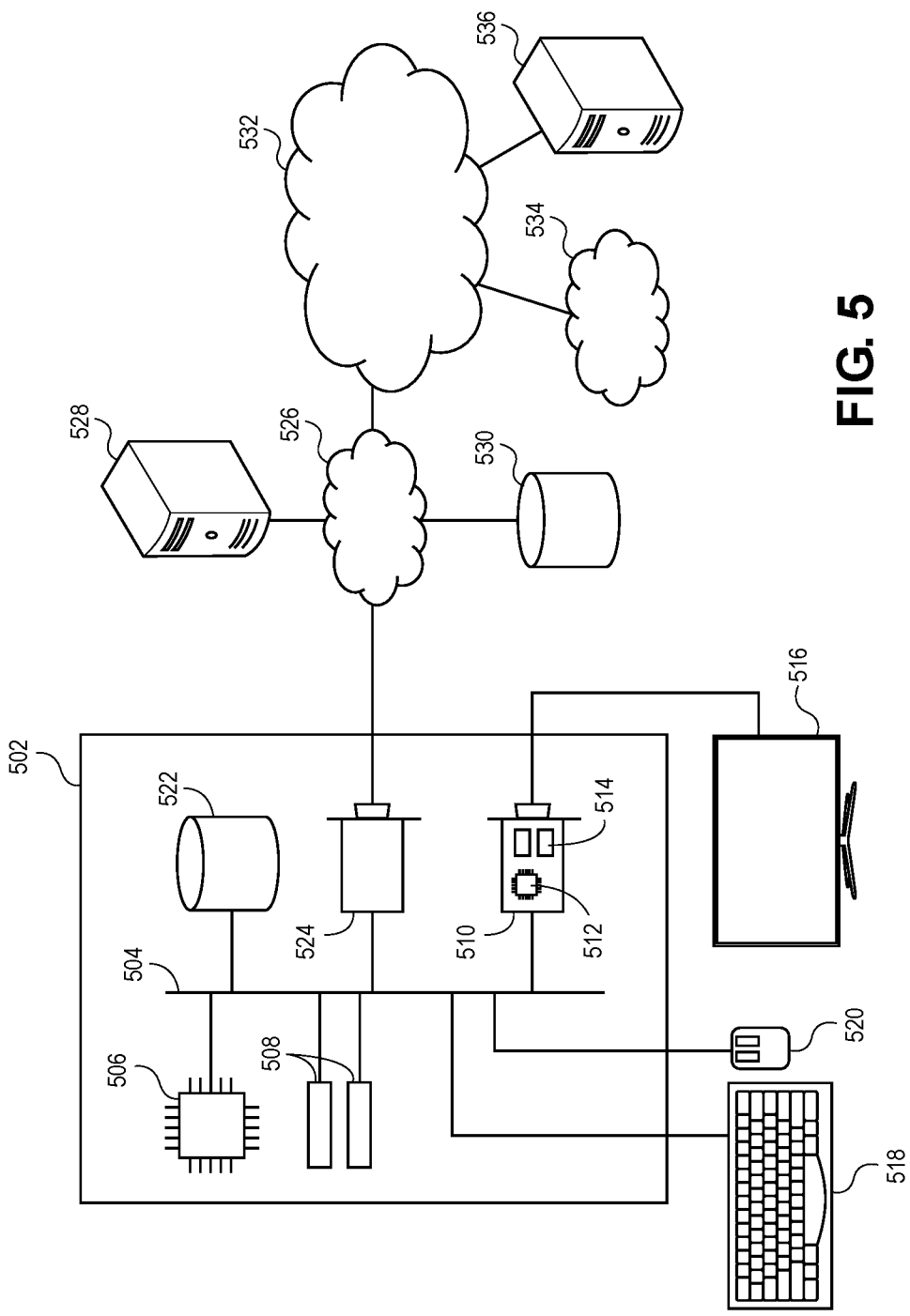
FIG. 5 depicts an exemplary hardware platform for certain embodiments.

Turning now to FIG. 5, in which an exemplary hardware platform for certain embodiments is depicted. Computer 502 can be a desktop computer, a laptop computer, a server computer, a mobile device such as a smartphone or tablet, or any other form factor of general- or special-purpose computing device containing at least one processor. Depicted with computer 502 are several components, for illustrative purposes. In some embodiments, certain components may be arranged differently or absent. Additional components may also be present. Included in computer 502 is system bus 504, via which other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also, on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, such as non-transitory computer readable media, and may be internally installed in computer 502 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the Institute of Electrical and Electronics Engineers (IEEE) 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over public Internet 532. Local network 526 is in turn connected to public Internet 532, which connects many networks such as local network 526, remote network 534 or directly attached computers such as computer 536. In some embodiments, computer 502 can itself be directly connected to public Internet 532.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method comprising:
receiving, from a data subject, a request for data retrieval to retrieve a plurality of attachments, each attachment comprising both data having identified structure and data not having identified structure, from a plurality of applications;
for each application of the plurality of applications, generating a distinct data model, each distinct data model comprising representations of the attachments containing information about the data subject, within a corresponding application, and embedding the distinct data model in an information lifecycle management (ILM) object, the ILM object containing a retention policy that defines when data stored in the ILM object is to be archived or destroyed, the ILM object comprising a plurality of tables, the ILM object further mapped to an object retrieval object that links to data not having identified structure;

adding, to each of the distinct data models, an attachment link for each of the attachments containing information about the data subject, within the corresponding application;
adding, to each object retrieval object, an object retrieval key;
retrieving attachment metadata for each of the attachments using the attachment link and the object retrieval key;
retrieving, from at least one data store, the attachments using the attachment metadata; and
providing, to the data subject, the attachments for download.

2. The method of claim 1, further comprising:
creating an instance object key associated with each attachment; and
retrieving the attachment metadata using the instance object key.

3. The method of claim 2, further comprising calling one or more application program interfaces to retrieve the attachments using the attachment metadata.

4. The method of claim 1, further comprising receiving, from the data subject, a purpose for data retrieval, wherein the purpose for data retrieval defines the plurality of applications from which data is to be retrieved.

5. The method of claim 1, further comprising structuring the attachments to be presented in a machine-readable and a human-readable manner.

6. The method of claim 1, further comprising assigning an authorization right for the data subject authorizing the data subject to view the attachments.

7. The method of claim 1,
wherein the data model comprises a table, and
wherein the representations of the attachments and the attachment link for each of the attachments are added to fields of the table.

8. The method of claim 1, wherein the distinct data model comprises a dummy table comprising a plurality of dummy fields storing virtual representations of each attachment to be retrieved, and wherein the adding comprises replacing the plurality of dummy fields with attachment links.

9. The method of claim 1, wherein the providing further comprises enabling read access logging such that access to sensitive personal data is logged to track who accessed personal data and which personal data was accessed.

10. The method of claim 1, wherein tables within the application are linked using field-to-field links between tables to locate personal data associated with the data subject.

11. The method of claim 1, wherein the retrieving comprises calling an Archive Link (ARL).

12. One or more non-transitory computer-readable media storing computer-executable instructions that, when executed by a processor, perform a method comprising:
receiving, from a data subject, a request for data retrieval to retrieve a plurality of attachments, each attachment comprising both data having identified structure and data not having identified structure, from a plurality of applications;
for each application of the plurality of applications, generating a distinct data model, each distinct data model comprising representations of the attachments containing information about the data subject, within a corresponding application, and embedding the distinct data model in an information lifecycle management (ILM) object, the ILM object containing a retention policy that defines when data stored in the ILM object is to be archived or destroyed, the ILM object comprising a plurality of tables, the ILM object further mapped to an object retrieval object that links to data not having identified structure;

adding, to each of the distinct data models, an attachment link for each of the attachments containing information about the data subject, within the corresponding application;

adding, to each object retrieval object, an object retrieval key;

retrieving attachment metadata for each of the attachments using the attachment link and the object retrieval key;

retrieving, from at least one data store, the attachments using the attachment metadata; and providing, to the data subject, the attachments for download.

13. The media of claim 12, further comprising receiving, from the data subject, a set of user identification parameters.

14. The media of claim 13, further comprising verifying an identification of the data subject using the set of user identification parameters.

15. The media of claim 12, further comprising:

retrieving a set of data having identified structured data from the at least one data store; and attaching the set of data having identified structure from the at least one data store to the data having no identified structure to contextualize the data having no identified structure.

16. The media of claim 12, wherein each application of the plurality of applications is associated with a retention object, and wherein the retention object defines a time period after which data stored in the application is archived or destroyed.

17. The media of claim 12, further comprising logging user activities to monitor access to the attachments to preserve privacy of the data.

18. The media of claim 12, further comprising storing a user profile for the data subject, wherein the user profile defines a set of download parameters for downloading the attachments.

19. A system comprising:

a data store;

a processor; and one or more non-transitory computer-readable media storing computer-executable instructions that, when executed by the processor, perform a method comprising:

receiving, from a data subject, a request for data retrieval to retrieve a plurality of attachments, each attachment comprising both data having identified structure and data not having identified structure, from a plurality of applications;

for each application of the plurality of applications, generating a distinct data model, each distinct data model comprising representations of the attachments containing information about the data subject, within a corresponding application, and embedding the distinct data model in an information lifecycle management (ILM) object, the ILM object containing a retention policy that defines when data stored in the ILM object is to be archived or destroyed, the ILM object comprising a plurality of tables, the ILM object further mapped to an object retrieval object that links to data not having identified structure;

adding, to each of the distinct data models, an attachment link for each of the attachments containing information about the data subject, within the corresponding application;

adding, to each object retrieval object, an object retrieval key;

retrieving attachment metadata for each of the attachments using the attachment link and the object retrieval key;

retrieving, from at least one data store, the attachments using the attachment metadata; and providing, to the data subject, the attachments for download.

20. The system of claim 19, wherein the method further comprises providing, to each application of the plurality of applications, a retrieval module to facilitate retrieving the attachment metadata.

* * * * *